United States Patent
Langston

(10) Patent No.: US 7,086,514 B2
(45) Date of Patent: Aug. 8, 2006

(54) AIR TURBINE STARTER ASSEMBLY

(75) Inventor: Todd A. Langston, Chandler, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/769,099

(22) Filed: Jan. 29, 2004

(65) Prior Publication Data

US 2005/0167227 A1  Aug. 4, 2005

(51) Int. Cl.
*F16D 11/06* (2006.01)
(52) U.S. Cl. .................. 192/46; 192/113.32
(58) Field of Classification Search .............. 192/41, 192/45.1, 46, 113.3, 113.32, 113.33
See application file for complete search history.

(56) References Cited

U.S. PATENT DOCUMENTS

| | | | | |
|---|---|---|---|---|
| 5,052,518 A | * | 10/1991 | Trommer | 184/6.12 |
| 5,070,978 A | | 12/1991 | Pires | |
| 5,474,152 A | * | 12/1995 | Wilkinson et al. | 184/6.12 |
| 5,699,889 A | | 12/1997 | Gadd | |
| 5,806,643 A | | 9/1998 | Fitz | |
| 5,964,331 A | * | 10/1999 | Reed et al. | 192/46 |
| 6,032,774 A | | 3/2000 | Gadd | |
| 6,089,112 A | * | 7/2000 | Kelly et al. | 74/7 C |
| 6,125,979 A | * | 10/2000 | Costin et al. | 192/46 |
| 6,244,965 B1 | * | 6/2001 | Klecker et al. | 464/81 |
| 6,338,403 B1 | * | 1/2002 | Costin et al. | 192/46 |

\* cited by examiner

*Primary Examiner*—Saul Rodriguez
(74) *Attorney, Agent, or Firm*—Ingrassia Fisher & Lorenz

(57) ABSTRACT

An aircraft engine starter assembly has a starter motor, a notch containing plate rotationally coupled to the starter motor or the aircraft engine, a strut pocket containing plate rotationally coupled to the other of the starter motor or the aircraft engine, arranged facing the notch containing plate and spaced apart therefrom by an inter-plate space, wherein the strut pocket containing plate has a spring loaded strut mounted in at least one pocket thereof, aligned to engage a notch as the two plates rotate with respect to each other about a common centerline, so that the strut engages the notch to start the engine and releases from the notch when the engine is running. A lube oil pump is provided to force oil into the inter-plate space and bearings are provided coupled to the two plates to react the expansion forces created by the pressurized lube oil.

16 Claims, 3 Drawing Sheets ated to the starter motor or the aircraft engine, a strut pocket containing plate rotationally coupled to the other of the starter motor or the aircraft engine and arranged facing the notch containing plate and spaced apart therefrom by an inter-plate space, wherein the strut pocket containing plate has a spring loaded strut mounted in at least one pocket thereof, aligned to engage a notch of the notch containing plate as the two plates rotate with respect to each other about a common centerline, so that the strut engages the notch to start the engine and releases from the notch when the engine is running. A lube oil pump is provided to force oil into the inter-plate space and bearings are provided coupled to the two plates to react the expansion forces created by the pressurized lube oil. The oil pump is preferably axially mounted in the assembly.

AIR TURBINE STARTER ASSEMBLY

TECHNICAL FIELD

The present invention generally relates to engine starters using an over-run clutch and, more particularly, to an air turbine driven starter assembly for aircraft engines, using a planar ratcheting one-way (PROW) clutch.

BACKGROUND

It is known in the art to provide engine starters that employ over-run clutches or one-way torque transfer gear assemblies between the starter motor and the engine. The over-run clutch or other one-way drive assembly allows the starter motor to turn the engine when the engine is substantially stationary, and then automatically disengage when the engine starts to run on its own, turning faster than the starter motor. An over-run clutch is a mechanical system able to transmit torque from a driving member to a driven member for only one direction of rotation and, generally, only when the driving member is rotating faster than the driven member. When the driven member is turning faster than the driving member or turning in the opposite direction, the over-run clutch slips and no torque is transmitted. Examples of various types of over-run clutches are illustrated in U.S. Pat. No. 5,070,978 to Pires, U.S. Pat. No. 5,699,889 to Gadd, U.S. Pat. No. 5,806,643 to Poway and U.S. Pat. No. 6,032,774 to Gadd. While such systems are useful, they suffer from a number of disadvantages, especially when applied to air turbine starters for aircraft engines. Among these disadvantages are excessive weight, noise, wear and cost. Accordingly there continues to be a need for improved one-way or over-run clutches, especially for aircraft engines.

Accordingly, it is desirable to provide an improved aircraft engine starter assembly using a planar ratcheting one-way (PROW) clutch as the torque-transmitting device. In addition, it is desirable that the improved aircraft starter assembly be adapted to work efficiently and reliably with an air turbine starter motor drive for the starter assembly. Furthermore, other desirable features and characteristics of the present invention will become apparent from the subsequent detailed description and the appended claims, taken in conjunction with the accompanying drawings and the foregoing technical field and background.

BRIEF SUMMARY

An aircraft engine starter assembly has a starter motor, a notch containing plate rotationally coupled to the starter motor or the aircraft engine, a strut pocket containing plate rotationally coupled to the other of the starter motor or the aircraft engine and arranged facing the notch containing plate and spaced apart therefrom by an inter-plate space, wherein the strut pocket containing plate has a spring loaded strut mounted in at least one pocket thereof, aligned to engage a notch of the notch containing plate as the two plates rotate with respect to each other about a common centerline, so that the strut engages the notch to start the engine and releases from the notch when the engine is running. A lube oil pump is provided to force oil into the inter-plate space and bearings are provided coupled to the two plates to react the expansion forces created by the pressurized lube oil. The oil pump is preferably axially mounted in the assembly.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
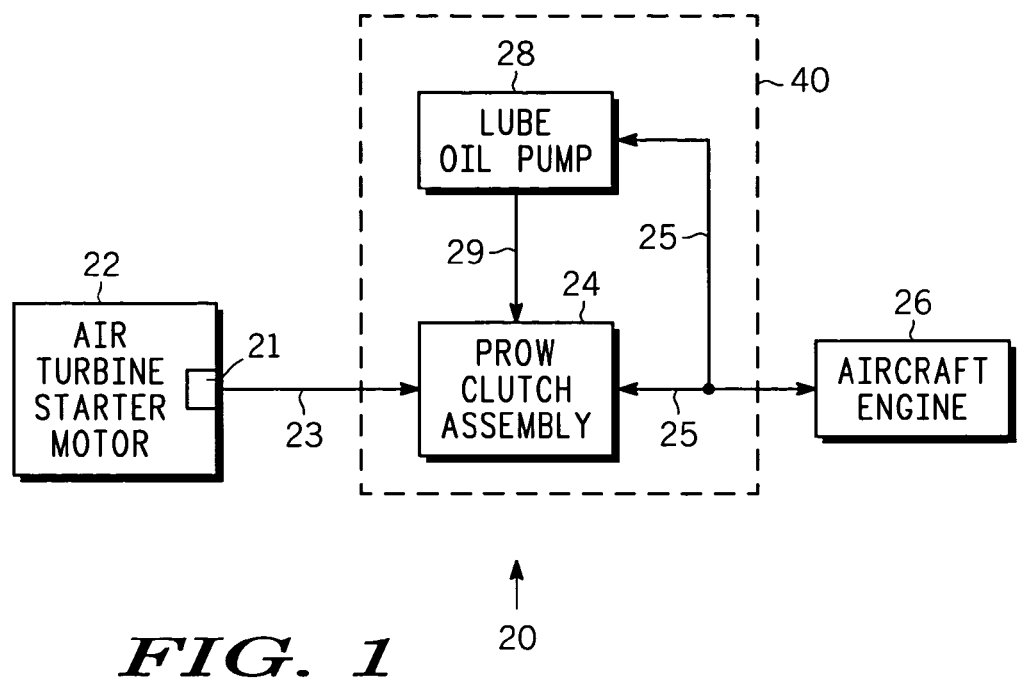
FIG. 1 is a simplified schematic block diagram of an air turbine starter assembly according to the present invention.

FIG. 1 is a simplified schematic block diagram of air turbine starter assembly 20 according to the present invention. Assembly 20 comprises air turbine starter motor 22, generally including reduction gear 21, planar ratcheting one-way (PROW) clutch assembly 24, aircraft engine 26 and internal lube oil pump 28. When it is desired to start aircraft engine 26, air turbine starter motor 22 provides torque over connection 23 to PROW clutch 24. Provided that connection 25 between clutch 24 and aircraft engine 26 is stopped or turning slower than connection 23, PROW clutch 24 engages and transfers torque over connection 25 to aircraft engine 26, causing it to turn. At the same time, the rotation of connection 25 causes lube oil pump 28 to pump oil 29 between the mating faces and other parts of PROW clutch 24, thereby preventing frictional damage. As aircraft engine 26 begins to operate the rotational speed of connection 25 increases and gradually exceeds the rotational speed of connection 23, whereupon PROW clutch 24 automatically releases and acts as an over-running clutch allowing connection 25 to rotate freely. Air turbine starter motor 22 and connection 23 can then stop. When aircraft engine 26 is running it supplies power over connection 25 to turn a portion of PROW clutch 24 and drive lube oil pump 28. As long as engine 26 and connection 25 are turning, lube oil pump 28 provides pressurized lube oil 29 so that PROW clutch 24 can operate with low friction in the over-run mode.

Figure 2:
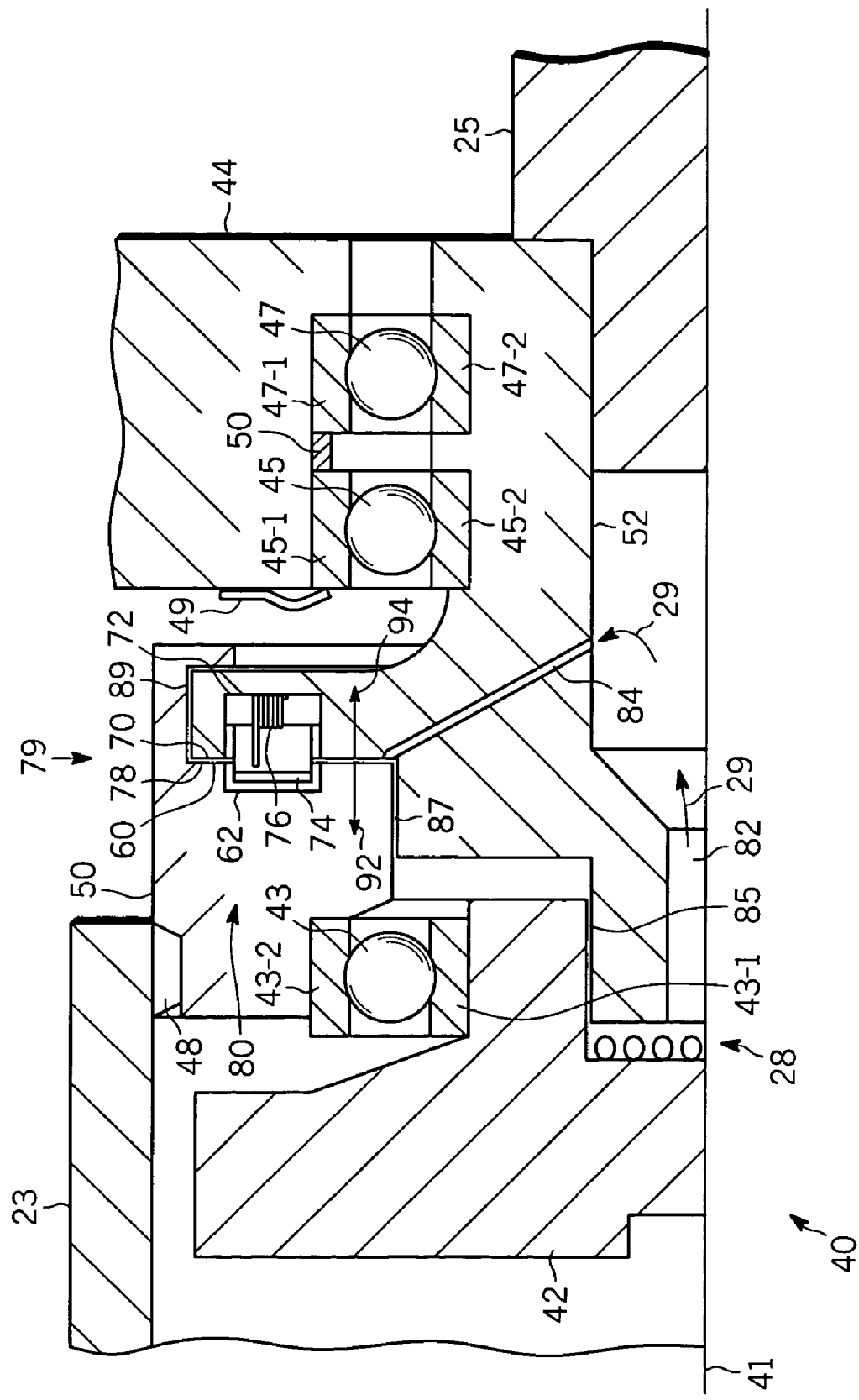
FIG. 2 is a simplified partial cross-sectional view through a portion of the assembly of FIG. 1, showing further details.

FIG. 2 is a simplified partial cross-section view through portion 40 of assembly 20 of FIG. 1, showing further details of PROW clutch 24 and internal lube oil pump 28. In FIG. 2, only half the structure is shown, it being substantially rotationally symmetric about centerline and axis of rotation 41. For convenience of description, the exterior housing around PROW clutch 24 and lube oil pump 28 is not shown so that attention can be focused on the interior operating elements of portion 40, Portion 40 has substantially stationary frame member (stator) 42 that conveniently supports interior race 43-1 bearing 43 and substantially stationary frame member (stator) 44 that conveniently supports exterior races 45-1, 47-1 of bearings 45, 47. While three bearings 43, 45, 47 are preferred, they are not essential. Bearing 43 coupling stator portion 42 and driving member 50 may be omitted. Driving member 50 is conveniently coupled to connection 23 via spline or other attachment means 48. Thus, connection 23 can also be used to support driving member 50, but this is not essential. Similarly, while two bearings 45,46 are desirably used to couple stator 44 and driven member 52, this is not essential since driven member 52 can be supported by connection 25. However, at least one of bearings 43, 45, 47 is convenient two of bearings 43, 45, 47 are desirable, and three bearings 43, 45, 47 are preferred. For example, having at least two bearings 45, 47 coupling stator 44 and rotating member 52 is desirable, since a double suspension reduces or eliminates radial whip in rotating member 52 independent of connection 25. This is especially desirable after engine start when member 52 is rotating at high speed driven by connection 25.

Bearing 43 has outer race 43-2 supporting driving member 50 and bearings 45, 47 have inner races 45-2 and 47-2 supporting driven member 52. Driven member 52 is coupled to connection 25 between aircraft engine 26 and clutch assembly 24. Any convenient coupling means may be used and a spline, rotating flex joint, rigid mount, vibration damper or a combination thereof are non-limiting examples of suitable connections, depending upon the needs of the user and the type of aircraft engine 26 coupled to connection 25. Persons of skill in the art will understand that a speed changing gearbox and other equipment (not shown) may be associated with aircraft engine 26, and for the purposes of this invention are assumed to be a part of engine 26. While member 52 is referred to for convenience of explanation as a "driven" member, persons of skill in the art will understand based on the explanation given herein that this status only occurs during engine start when torque is being transmitted from starter motor 22 through PROW clutch assembly 24 to aircraft engine 26. Once start has occurred, and PROW clutch assembly 24 has disconnected input connection 23 and output connection 25, then member 52 is being driven by aircraft engine 26 through connection 25. However, for consistency and to more easily distinguish the various rotating parts, member 52 will continue to be referred to as a "driven" member unless specifically noted otherwise, even though it is a driving member in post-start operation.

Figure 3:
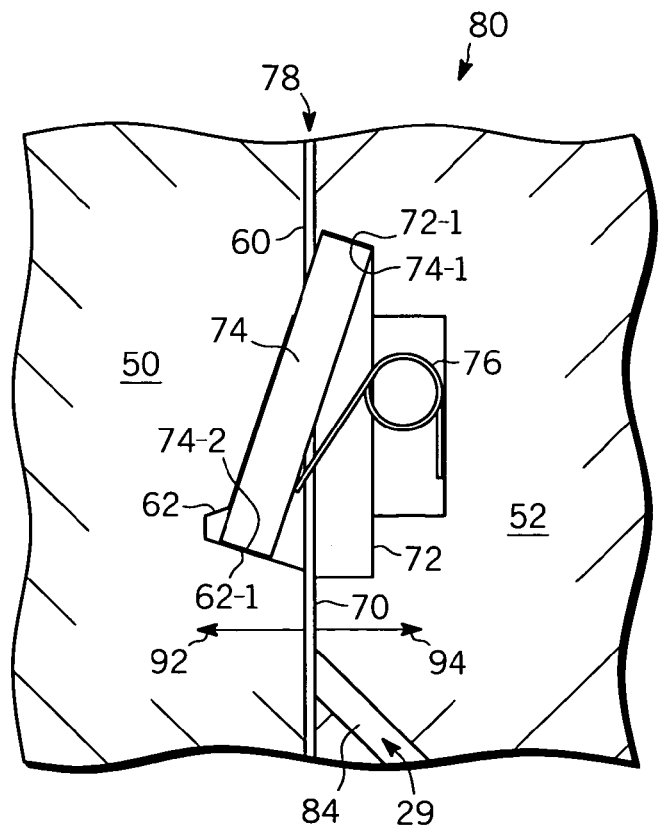
FIGS. 3 is an enlarged cross-sectional view of a portion of the assembly of FIG. 2 showing still further details.
Figure 4A:
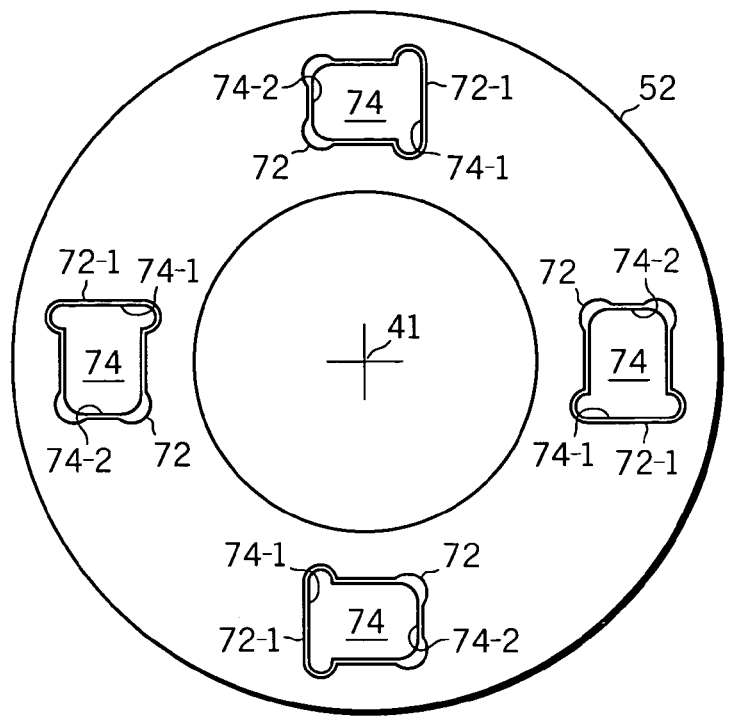
FIGS. 4A–4B are plan views of opposed clutch faces illustrated in FIG. 2.
Figure 4B:
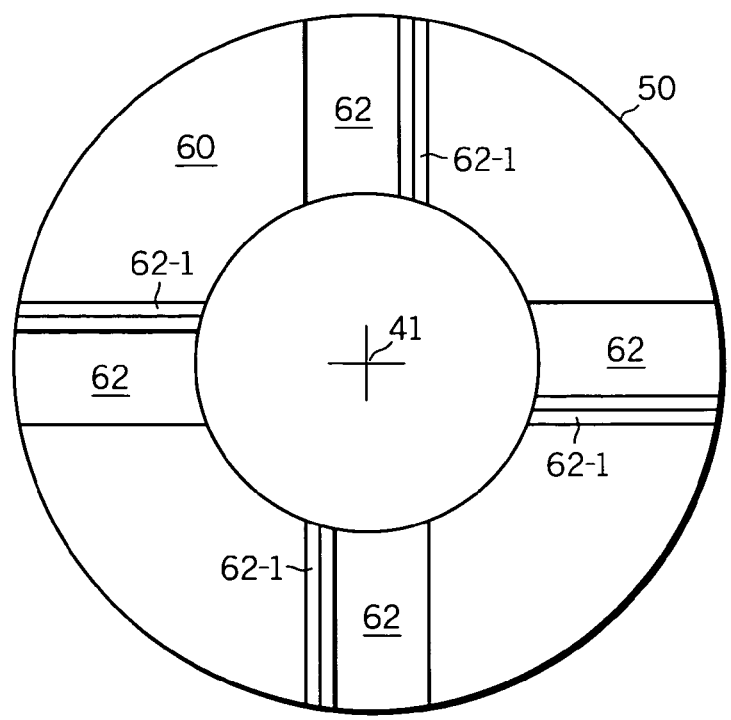

FIGS. 3 is an enlarged cross-sectional view of portion 80 of assembly 40 of FIG. 2, taken horizontally perpendicular to the plane of FIG. 2 looking in the direction of arrow 79 on FIG. 2, and showing still further details. Referring now to FIGS. 2 and 3 together, driving member 50 conveniently has face 60 that is conveniently but not essentially substantially perpendicular to axis of rotation 41 of portion 40. (FIG. 4B shows a plan view looking toward face 60 of member 50, according to a further embodiment.) Set into face 60 are one or more notches 62. Driven member 52 has face 70 that is conveniently but not essentially substantially perpendicular to axis of rotation 41 of portion 40. Set into face 70 are one or more pockets 72. (FIG. 4A shows a plan view looking toward face 70 of member 52.) Located in each pocket 72 is moveable pawl or strut 74 having first end 74-1 that mates with first end 72-1 of pocket 70 and second distal end 74-2 that is urged outward from face 70 by spring 76 so as to engage first end 62-1 of notch 62 in face 60 when member 50 is driving member 52, and retract into pocket 72 when PROW clutch 24 is in the over-run operation mode, that is, not driving member 52. Separating faces 60 and 70 of members 50, 52 is inter-plate space 78 filled with oil 29 supplied by lube oil pump 28 via channels 82, 84. One side of pump 28 is coupled to stator member 42 and the other side is conveniently driven by rotating member 52. The exact type of pump mechanism is not important so along as it can be powered by the differential motion of members 42, 52 or 50, 52. Any convenient type of pump may be used, however a "gerotor" pump is preferred. Gerotor pumps are available, for example, from Lear Romec of Elyria, Ohio and other suppliers. Oil 29 conveniently returns to pump 28 via channels 85, 87, 89 and others (not shown) that separate and/or penetrate members 42, 50, 52 but this is not essential. Any convenient means of returning oil 29 to pump 28 may be used. The combination of pocket 72, strut or pawl 74, notch 62, spring 76, oil pump 28 and the other elements described herein, provide the desired planar ratcheting one way (PROW) clutch, that is, a quick engaging and releasing, low friction, one-way torque transfer mechanism.

FIGS. 4A–B are plan views looking toward opposed clutch faces 60, 70 in FIG. 2, illustrating multiple notches, pockets and struts spaced circumferentially around faces 60, 70, according to the present invention. For clarity of explanation, the details of the remainder of elements 50, 52 have been omitted from FIGS. 4A–4B so that attention can be directed to the operative features in clutch faces 60, 70. In FIGS. 4A–4B, clutch plate faces 60, 70 are shown as having four notches and four pockets with four struts 74, evenly circumferentially spaced around faces 60, 70, but this is merely for convenience of explanation and not intended to be limiting. One or more notches 62, pockets 72 and struts 74 may be provided, the exact number depending upon the user's design requirements. In the prior art, it has been common to provide an odd number of pockets 72 and struts 74, and either an odd number or an even number of notches 62, so that when connection 23 begins to turn, only one of struts 74 engages one of pockets 62. However, with the present invention, it is preferred that there be an even number of notches 62 and an even number of pockets 72 and struts 74 and that the circumferential and radial spacing thereof be such that substantially all are capable of mating at the same time. As clutch face 60 begins to turn relative to clutch face 70, it is preferred that more than one strut-notch combination engage, that is several of struts 74 substantially simultaneously engage several of notches 62. This spreads the torque load among several strut-notch combinations, thereby increasing the torque handling capability and reducing the wear in the PROW clutch. This is accomplished by having all pocket and strut sizes and locations mate with the notch sizes and locations. FIGS. 2 and 4 illustrate two variations with respect to the design of notches 60. In FIG. 2, notch 60 is shown as having limited radial extent, that is, its radial dimension perpendicular to centerline and axis of rotation 41 is only slightly larger than that of strut 74 while in FIG. 4, notch 60 is shown as extending radially across entire face 60, that is, having a radial extent substantially larger than the radial width of strut 74. Either arrangement is useful. The arrangement shown in FIG. 2 is preferred.

When driving member 50 begins to turn, as soon as one or more pawls or struts 74 in pockets 72 engages one or more notches 62 in face 60 of driving member 50, driven member 52 begins to turn, thereby driving lube oil pump 28 that supplies pressurized oil 29 to inter-plate space 78 between faces 60, 70 and channels 85, 87, 89. As long as member 52 is turning with respect to stator member 42, oil pump 28 continues to operate. Thus, even after start is completed and driving member 50 stopped and clutch 24 is in the over-run condition, pump 28 continues to provide lube oil 29 to inter-plate space 78 and to cushion strut or pawl 74 as it rotates against face 60 of now stationary member 50. In the preferred embodiment, faces 60, 70 are substantially perpendicular to axis of rotation 41. However, this is convenient but not essential. Alternatively, faces 60, 70 can be, for example and not intended to be limiting, cone shaped or cylindrically shaped, that is not substantially perpendicular to axis of rotation 41 but forming a predetermined angle with axis 41 or parallel to axis 41. Either arrangement is useful.

What is more important is that faces 60, 70 be substantially parallel and comparatively closely spaced so that one or more struts 74 may bridge between pockets 72 and notches 62 and so that struts 74 are retained in pockets 72 in the over-run state. Thus, in the preferred embodiment, inter-plate space 78 between faces 60 and 70 is small and readily filled by pressurized oil 29 which provides a lubricating film on which struts 74 ride against face 60 when clutch 24 is in the over-run state.

Lube oil pump 28 is preferably axially mounted so that the centerline of pump 28 corresponds approximately to centerline 41 of assembly 40, but this is not essential. However, it is desirable that lube oil pump 28 be mounted within members 50 or 52, that is, radially between pocket 72 and centerline 41 since this gives a more compact assembly with good lubrication capabilities. As used herein the word "axially mounted" are intended to include any pump location within members 50 or 52 and not be limited merely to pumps whose axis of rotation is coincident with centerline 41. The use of lube oil pump 28 supplying pressurized oil 29 to inter-plate space 78 and gaps 85, 87, 89 results in superior lubrication and lower friction compared the prior art, which has typically used an oil immersion approach. However, with the arrangement shown in FIGS. 2–3, pressurizing inter-plate space 78 creates axially directed forces 92, 94 (see FIGS. 2–3) pushing in opposite directions on faces 60, 70, respectively. This has the effect of tending to axially separate faces 60, 70 and corresponding rotating members 50, 52. Therefore, one or more bearings 43-47 are provided to react axially directed forces 92, 94. Force 94 is transferred from face 70 of rotating member 52 to one or the other or both inner races 45-2, 47-2 thence through one or the other or both bearings 45, 47 to one or the other or both outer races 45-1, 47-1 and thence to stator 44. Similarly, force 92 is transferred from face 60 through rotating member 50 to outer race 43-2, through bearing 43 to inner race 43-1 and thence to stator 42. Spring 49 is desirably provided to pre-load outer race 45-1 of bearing 45 so that bearing chatter is reduced or avoided. In the preferred embodiment, a wavy spring is used, but this is merely for convenience and any convenient form of low wear pre-load spring may be used. By including annular spacer 50, both outer races 45-1, 47-1 may be pre-loaded by spring 49, but this is not essential. One or more similar springs (not shown) may be provided to preload one or both races 43-1, 43-2 of bearing 43 for the same purpose, but this is not essential.

The foregoing description has been in terms of driving member 50 having notch plate face 60 and driven member 52 having pocket and strut plate face 70, but this is merely for convenience of explanation and not intended to be limiting. Persons of skill in the art will understand that the present invention works equally well when these roles are reversed, that is, when face 70 with its associated pockets 72 and struts 74 is coupled to driving member 50 in place of face 60 and face 60 with its associated pockets is coupled to driven member 52 in place of face 70, that is the notch and pocket plates faces are swapped. Stated another way, notch plate 60 can be coupled to either starter motor 22 or aircraft engine 26 and strut pocket plate 70 is then correspondingly coupled to the other of starter motor 22 or aircraft engine 26. Either arrangement is useful.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An aircraft engine starter having a centerline of rotation and comprising:
    a torque transfer connection adapted to be coupled to the aircraft engine;
    a starter motor;
    a notch plate, coaxial with the centerline and rotationally coupled to one of the starter motor or the torque transfer connection, and having a first face with at least one notch therein;
    a strut pocket plate, coaxial with the centerline and rotationally coupled to the other of the starter motor or the torque transfer connection, and having a second face substantially parallel to the first face and spaced apart therefrom by an inter-plate space, wherein the second face has at least one pocket therein facing toward the first face;
    at least one spring located in the at least one pocket and having first and second ends, the first end bearing against the strut pocket plate;
    at least one strut moveably retained in the at least one pocket and having first and second ends, the first end bearing against the strut pocket plate and the second end free to move toward the notch plate under the action of the at least one spring whose second end bears against the at least one strut thereby forcing the second end of the at lest one strut toward the notch plate, wherein for a first relative rotational direction and speed the at least one strut engages the at least one notch thereby causing the starter motor to turn the torque transfer connection and for a different relative rotational speed, the at least one strut does not engage the at least one notch and the torque transfer connection can turn freely with respect to the starter motor;
    an axially mounted oil pump coupled to one or both of the notch plate or strut pocket plate and delivering oil under pressure to the inter-plate space through one or more holes in either the strut pocket plate or the notch plate or both, the oil under pressure in the inter-plate space creating an axially directed force tending to separate the strut pocket plate and the notch plate;
    first and second stators for supporting the notch plate and the strut pocket plate, respectively; and
    one or more support bearings having a first race coupled to the strut pocket plate, a second race coupled to the notch plate for radially supporting the strut pocket plate with respect to the notch plate and reacting the axially directed force.

2. The starter of claim 1
    wherein the one or more support bearings comprise at least two support bearings, a first bearing coupled between the notch plate and the first stator and the second bearing coupled between the strut pocket plate and the second stator.

3. The starter of claim 2 further comprising a third bearing coupled between the strut pocket plate and the second stator.

4. The starter of claim 2 further comprising a third bearing coupled between the notch plate and the first stator.

5. The starter of claim 1 further comprising:
a substantially axially oriented protrusion on the strut pocket plate facing away from the first face thereof and encompassing the centerline, and
wherein the at lest one support bearing comprises a pair of annular bearings with the first races thereof coaxially mounted on the protrusion.

6. The starter of claim 1 further comprising:
a pre-load spring coupled to a race of the at least one bearing for providing an axial force for pre-loading the race.

7. The starter of claim 1 wherein the notch plate has an even number of evenly distributed notches and the strut pocket plate has an even number of evenly distributed pockets and struts adapted to mate with the evenly distributed notches.

8. The starter of claim 7 wherein the struts and notches are arranged so that they can all engage substantially simultaneously.

9. An aircraft engine starter, comprising:
a starter motor;
a torque transfer member adapted to be coupled to the aircraft engine;
a notch containing plate adapted to be rotationally coupled to the starter motor or the torque transfer member;
a strut pocket containing plate adapted to be rotationally coupled to the other of the starter motor or the torque transfer member, spaced apart from the notch containing plate by an inter-plate space so that a notch and a pocket can be aligned in facing arrangement;
first and second stators for supporting the notch containing plate and the strut pocket containing plate, respectively;
a spring loaded strut mounted in a pocket, aligned to engage a notch as the two plates rotate with respect to each other about a common centerline, wherein the strut engages the notch to start the engine and releases from the notch when the engine is running;
a lube oil pump coupled to the torque transfer member to provide pressurized oil to the inter-plate space; and
one or more bearings coupling the two plates and reacting expansion force created by the pressurized lube oil.

10. The starter of claim 9, wherein the plates rotate around a common centerline around which the lube oil pump rotates.

11. The starter of claim 10 wherein the one or more bearings comprise at least two bearings, a first bearing having a first race coupled to the notch containing plate and a second bearing having a first race coupled to the strut pocket containing plate and wherein the first and second bearings have mutually coupled second races.

12. The starter of claim 11 further comprising a third bearing having races arranged in parallel with but spaced-apart from the races of the second bearing.

13. A clutch having a centerline and adapted to couple an air starter motor to an aircraft engine, the clutch comprising:
a notch containing plate adapted to be rotationally coupled to one of the starter motor or the aircraft engine;
a strut pocket containing plate adapted to be rotationally coupled to the other of the starter motor or the aircraft engine, and spaced apart from the notch containing plate by an inter-plate space so that a notch and a pocket can be aligned in facing arrangement;
first and second stators for supporting the notch containing plate and the strut pocket containing plate, respectively;
a spring loaded strut mounted in the pocket, aligned to engage the notch as the two plates rotate with respect to each other about the common centerline, wherein the strut engages the notch to start the engine and releases from the notch when the engine is running;
a substantially axially mounted lube oil pump coupled to at least one of the notch containing or strut pocket containing plates to provide pressurized oil to the inter-plate space; and
one or more bearings coupling the two plates and reacting expansion force created by the pressurized lube oil.

14. The clutch of claim 13 wherein the notch containing plate has a first face for containing the notch and the strut pocket containing plate has a second face for containing the pocket and the first and second faces are substantially perpendicular to the centerline in facing arrangement.

15. The clutch of claim 13 wherein the notch containing plate has a first face for containing the notch and the strut pocket containing plate has a second face for containing the pocket and the first and second feces are oriented at a non-ninety degree angle to the centerline in facing arrangement.

16. The clutch of claim 13 wherein the notch containing plate has a first face for containing the notch and the strut pocket containing plate has a second face for containing the pocket and the first and second faces are oriented substantially parallel to the centerline in facing arrangement.

* * * * *

UNITED STATES PATENT AND TRADEMARK OFFICE
CERTIFICATE OF CORRECTION

PATENT NO. : 7,086,514 B2 Page 1 of 1
APPLICATION NO. : 10/769099
DATED : August 8, 2006
INVENTOR(S) : Todd A. Langston It is certified that error appears in the above-identified patent and that said Letters Patent is hereby corrected as shown below:

Column 8, line 40, "feces" should be changed to --faces--.

Signed and Sealed this

Twenty-seventh Day of March, 2007

JON W. DUDAS
*Director of the United States Patent and Trademark Office*